United States Patent
Slocum

(10) Patent No.: US 9,784,379 B2
(45) Date of Patent: Oct. 10, 2017

(54) T SHAPED DEFLATOR TOOL

(71) Applicant: Steven Keith Slocum, Merced, CA (US)

(72) Inventor: Steven Keith Slocum, Merced, CA (US)

( * ) Notice: Subject to any disclaimer, the term of this patent is extended or adjusted under 35 U.S.C. 154(b) by 84 days.

(21) Appl. No.: 14/984,447

(22) Filed: Dec. 30, 2015

(65) Prior Publication Data

US 2017/0191578 A1    Jul. 6, 2017

(51) Int. Cl.
  *F16K 15/20*    (2006.01)
  *F16K 15/18*    (2006.01)

(52) U.S. Cl.
  CPC .......... *F16K 15/185* (2013.01); *F16K 15/202* (2013.01); *F16K 15/20* (2013.01)

(58) Field of Classification Search
  CPC ...... B66C 29/00; F16K 15/185; F16K 15/202
  USPC .................................................. 81/15.4, 15.7
  See application file for complete search history.

(56) References Cited

U.S. PATENT DOCUMENTS

| | | | | |
|---|---|---|---|---|
| 737,293 A * | 8/1903 | Summerfeldt | . A61B 17/320758 | 600/564 |
| 806,746 A * | 12/1905 | Miller | ................. A61M 5/3286 | 604/274 |
| 984,239 A * | 2/1911 | Pawsat | .................... B60C 29/00 | 152/431 |
| 1,091,839 A * | 3/1914 | Haverfield | .............. B60C 29/00 | 152/415 |
| 1,126,743 A * | 2/1915 | Faulkner | ................. B60C 29/00 | 81/15.4 |
| 1,256,388 A * | 2/1918 | Stevens | .................... B60C 29/00 | 81/15.4 |
| 1,460,027 A * | 6/1923 | Maddock | ................ B60C 29/00 | 81/15.4 |
| 1,630,040 A * | 5/1927 | Vogt | ...................... F16K 15/202 | 137/223 |
| 1,664,621 A * | 4/1928 | Goff | ........................ B29B 15/06 | 81/15.4 |
| 1,708,346 A * | 4/1929 | Worrell | .................... B29C 73/26 | 15/236.05 |
| 1,811,656 A * | 6/1931 | Sommerbeck | .......... B29C 73/06 | 81/15.7 |
| 1,828,813 A * | 10/1931 | Lehmann | ................ B29C 73/26 | 30/169 |
| 1,857,703 A * | 5/1932 | Westphal | ................ B60C 25/16 | 81/15.2 |

(Continued)

*Primary Examiner* — Joseph J Hail
*Assistant Examiner* — Arman Milanian

(57) ABSTRACT

This invention is a device designed to deflate rubber rafts, inner tubes, air mattresses and other inflatable objects equipped with cut-check valves or self-closing squeeze valves. The device is constructed of a rigid material, the body of which is comprised of a slender conical shape, terminating in a perpendicular T shaped handle. A tapered air gap runs through the core of the slender conical body along the vertical axis of the device. When inserted into said valves, the smooth rounded tip of the device safely penetrates the cut-check or flap portion of the valve, allowing air to flow from the inflatable object, through the device, and into the atmosphere. The tapered body is compatible with valves of various size diameters. When inserted into said valves, friction ensures the device will remain firmly seated inside said valves allowing hands free deflation.

2 Claims, 3 Drawing Sheets

(56) References Cited

U.S. PATENT DOCUMENTS

| | | | | | |
|---|---|---|---|---|---|
| 1,914,800 | A | * | 6/1933 | Boyett | B29C 73/26 30/169 |
| 1,990,000 | A | * | 2/1935 | Pike | B60C 25/16 81/15.4 |
| 2,145,218 | A | * | 1/1939 | Broecker | B60C 29/00 138/89.3 |
| 2,271,370 | A | * | 1/1942 | Gora | B60C 29/00 81/15.4 |
| 2,353,386 | A | * | 7/1944 | Bourcier | E01F 13/12 256/1 |
| 2,600,862 | A | * | 6/1952 | Fenton | F16K 15/202 137/223 |
| 2,674,064 | A | * | 4/1954 | Gassaway | F16K 15/202 137/846 |
| 2,841,166 | A | * | 7/1958 | Auzin | A47C 27/081 137/223 |
| 3,368,302 | A | * | 2/1968 | Martino | B64B 1/62 137/223 |
| 4,405,158 | A | * | 9/1983 | Huberman | A47L 7/04 137/223 |
| 4,690,375 | A | * | 9/1987 | Vorhis | F16K 7/02 222/490 |
| 5,746,243 | A | * | 5/1998 | Franke | F16K 15/145 137/223 |
| 8,402,986 | B1 | * | 3/2013 | Gray | A47L 7/04 137/223 |
| D740,328 | S | * | 10/2015 | Maw | D15/7 |

* cited by examiner 2-3

T SHAPED DEFLATOR TOOL

BACKGROUND OF THE INVENTION

Technical Field

This invention is a device designed to deflate objects equipped with cut-check valves or self-closing squeeze valves (hereinafter, "valve" or "valves"). These valves are widely used in the manufacture of inflatable rubber rafts, inner tubes, air mattresses, children's arm "floaties," inflatable toys etc. Said valves are made from a pliable material and are cylindrical in shape. These valves have a removable plug at one end and a cut-check or flap across the opposite end which extends inside the surface of the inflatable object. When squeezed, air flows from the inflatable object, through the valve, and into the atmosphere. These valves are manufactured in various size diameters.

Inflatable objects utilizing these valves are widely regarded as cumbersome to deflate and can create the following problems for the user. 1) Wasted Time: An individual must be present and continuously squeeze the valve or deflation will stop. Deflation can take a lengthy period of time depending on the size of the inflatable and the diameter of the valve. 2) Discomfort: Prolonged manual squeezing of these valves can become tiring and cause hand cramping or other discomfort for the user. 3) Assistance Needed: During deflation, one hand must continuously squeeze the valve leaving the operator with only one free hand to squeeze or fold the inflatable to expel any remaining air trapped inside. A second person is often required to efficiently deflate large inflatables such as rubber rafts and air mattresses. 4) Waste: Small inflatable objects are mass produced and inexpensive to purchase. The burdensome task of deflation can cause individuals to destroy and discard these inflatables rather than spend the requisite time to deflate and store them for future use. Unnecessarily discarding inflatables negatively impacts landfills and our environment.

This invention solves these problems by providing a hands free solution to deflating objects equipped with said valves. Because air flows from a higher pressure zone to a lower pressure zone, inflatable objects will deflate automatically when this device is inserted into these valves, until the air pressure equalizes. If the user desires to hasten deflation, this device frees up both hands for squeezing or folding inflatables, thereby accelerating the deflation process.

This invention provides a simple to use, inexpensive, versatile and reliable tool to aid in the deflation of objects manufactured with said valves.

Background Art

Your applicant performed a thorough patent search to determine what other deflators are designed to accomplish these objectives. There is one prior art designed to achieve similar objectives: U.S. Pat. No. 5,007,449 (see also Publication No. US20110011466). This prior art expresses an entirely different method of deflating objects, utilizing a clamping device which is applied externally to said valves. Your applicant's invention is distinguishable from all prior art.

Your applicant's invention is not designed to clamp to the external wall of said valves. Rather, this invention is designed for insertion into said valves. There are several advantages to this new invention. First, this device is designed to fully penetrate the cut-check or flap portion of the valve, maximizing airflow from the inflatable into the atmosphere. Further, there is no guess work on how much clamping pressure must be applied externally to, maximize the size of the valve's internal opening. Simply insert the device until seated against the interior cylinder wall of said valves, maximizing the opening size and airflow of said valves. Finally, while this device and prior art are both designed for hands free deflation, prior art can slip off or be knocked off said valves during deflation particularly when an inflatable is squeezed or folded by the user to evacuate any remaining air trapped inside. This devices will remain firmly seated inside said valves until deflation is complete.

This invention is not an improvement upon any prior art, but rather, is of a completely new design.

BRIEF SUMMARY OF THE INVENTION

This invention is a device constructed of a rigid material, the body of which is comprised of a slender conical shape, terminating in a T shaped handle. A tapered air gap runs through the core of the conical body along the vertical axis of the device. The device is inserted into said valves, safely penetrating the cut-check or flap portion of the valve, allowing air to flow from the inflatable, through the device, and into the atmosphere. The slender conical shape allows use with valves of various size diameters. Friction between the conical body of the device and the cylindrical wall of said valves ensures that the device will remain seated in said valves during hands free deflation. Full penetration of the cut-check or flap portion of the valve ensures maximum airflow during deflation.

DETAILED DESCRIPTION OF THE INVENTION

This invention is a device constructed of a rigid material, the body of which is slender and conical in shape, terminating in a T shaped handle. A tapered air gap runs through the core of the conical body along the vertical axis of the device. When inserted into said valves, the device safely penetrates the cut-check or flap portion of said valves, allowing air to flow from the inflatable object, through the tapered air gap, and into the atmosphere.

The smooth rounded tip of the device is 2 mm (0.08 inches) in diameter. From the rounded tip, the device increases in diameter at a fixed rate, in conical form, to a diameter of 10 mm (0.39 inches). At the terminus of the conical body, the device melds into a T shaped handle which is perpendicular to the conical body. The T handle is 45 mm (1.78 inches) in length, 10 mm (0.4 inches) wide, and 10 mm (0.4 inches) thick. The overall length of the device is 65 mm (2.56 inches).

The tapered air gap consists of a void which runs completely through the core of the conical body along the vertical axis of the device. The tapered air gap begins 5 mm (0.2 inches) above the solid rounded tip of the device. Said tapered air gap has a length of 50 mm (1.97 inches), a width starting at 0.5 mm (0.02 inches), gradually increasing at a fixed rate to a width of 7 mm (0.27 inches).

The center of the T shaped handle contains a symmetrically tapered wedge which is 7 mm (0.27 inches) wide. The wedge cut into both sides of the T handle is designed to ensure air continues to flow from the inflatable when the device is fully inserted into said valves, to the hilt of the T handle. Without the wedge the device would act as a plug rather than a deflator, when fully inserted into said valves. The T shaped handle permits easy insertion and extraction of the device.

Figure 1:
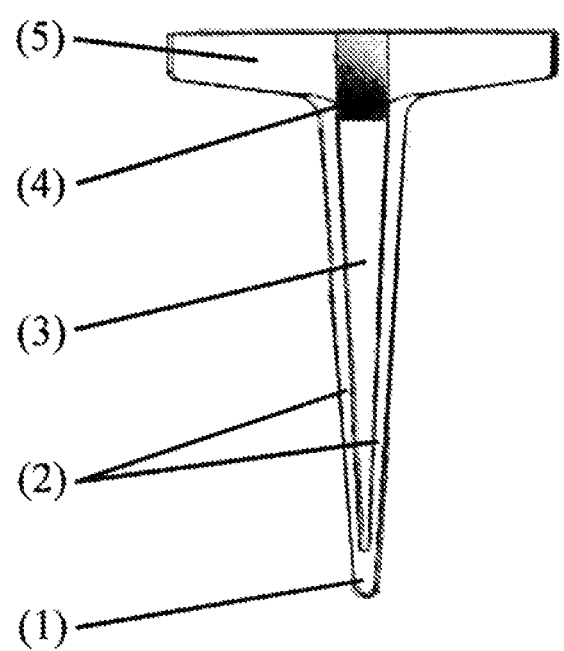
FIG. 1 contains a one dimensional profile view of the device, depicting the solid rounded tip (1); the slender conical body (2): the tapered air gap (3); the wedge at the center of the T shaped handle (4) and the T shaped handle (5).
Figure 2:
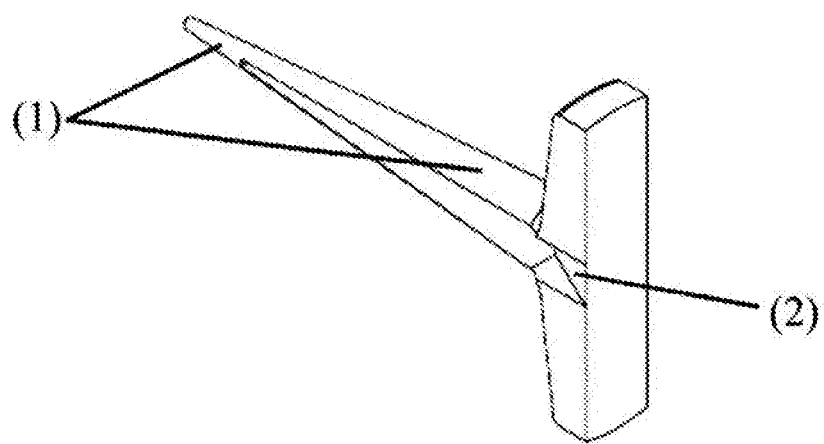
FIG. 2 contains a two dimensional view of the invention depicting the slender conical body (1) and the wedge at the center of the T shaped handle which tappers down into the handle, terminating at the top of the tapered air gap (2).
Figure 3:
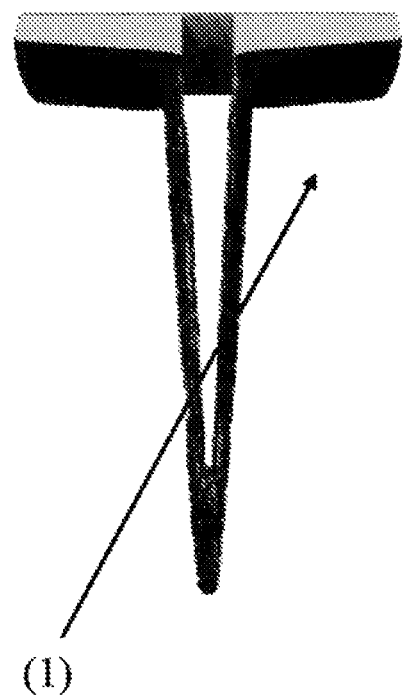
FIG. 3 contains a two dimensional view of the invention looking directly through the tapered air gap (1) which passes completely through the core along the vertical axis of the slender conical body.

With reference to the drawings FIG. 1 depicts the rounded tip (1); the slender conical body (2); the tapered air gap (3); the wedge at the center of the T handle (4); and the T handle (5) FIG. 2 depicts the slender conical body (1) and the symmetrical wedge at the base of the T handle (2). Although not depicted in FIG. 2, the wedge tapers down evenly into both sides of the T handle, and terminates at the top or widest point of the tapered air gap. FIG. 3 contains a view looking directly through the tapered air gap (1).

The slender conical body is designed to fit vales of various size diameters. Friction between the conical body and said cylindrical valves ensures that the device will remain firmly seated inside said valves during hands free deflation. The rounded tip of the device is smooth to ensure the internal components of the valve are never damaged during insertion or extraction.

This device and its preferred embodiment are apparent from the drawings, description and claims set forth below. Other manifestations of this invention will be obvious from these disclosures, which do not materially deviate from the invention herein claimed. This device can be manufactured by way of molding, or the plastic extrusion process.

The invention claimed is:

1. A deflator device for use in conjunction with inflatable objects manufactured with cut-check valves or self-closing squeeze valves, said deflator comprising a conical shaped body, said conical shaped body having a solid rounded tip, the terminus of said conical shaped body melding into a T shaped handle, said conical shaped body having an air gap which passes all the way through said conical shaped body, said air gap beginning above the solid rounded tip, said air gap increasing in width along the vertical axis of said conical shaped body, said air gap terminating at its greatest width below said T shaped handle, the bottom of said T shaped handle comprising a wedge shape, said wedge shape beginning inside said air gap and melding into said T shaped handle, said deflator device to be inserted into cut-check valves or self-closing squeeze valves, said conical shaped body penetrating the cut-check or flap portions of said valves, allowing air to flow from inside said inflatable objects, through said air gap, and into the atmosphere, said wedge shape preventing the deflator device from plugging said valves when fully inserted into said valves.

2. The deflator device of claim 1, said conical shaped body having an overall length of 65 mm (2.56 inches), said solid rounded tip measuring 2 mm (0.08 inches) in diameter, said conical shaped body increasing in width to 10 mm (0.39 inches) in diameter, said air gap having an overall length of 50 mm (1.97 inches), said air gap starting 5 mm (0.20 inches) above said solid rounded tip, said air gap measuring 0.5 mm (0.02 inches) in width and gradually increasing in width to 7 mm (0.27 inches), said T shaped handle, excluding said wedge shape, measuring 45 mm (1.78 inches) in length, 10 mm (0.4 inches) wide and 10 mm (0.4 inches) thick.

* * * * *